United States Patent
Simonyi et al.

(10) Patent No.: US 9,798,441 B2
(45) Date of Patent: Oct. 24, 2017

(54) DISPLAYING A POST UNIT WITHIN A STREAM INTERFACE

(71) Applicant: GOOGLE INC., Mountain View, CA (US)

(72) Inventors: Gyula Simonyi, Dublin (IE); Zoltan Stekkelpak, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 114 days.

(21) Appl. No.: 13/731,629

(22) Filed: Dec. 31, 2012

(65) Prior Publication Data
US 2014/0189535 A1    Jul. 3, 2014

(51) Int. Cl.
G06F 3/0481 (2013.01)
G06Q 50/00 (2012.01)
G06Q 10/10 (2012.01)

(52) U.S. Cl.
CPC ......... G06F 3/04815 (2013.01); G06Q 10/10 (2013.01); G06Q 10/107 (2013.01); G06Q 50/01 (2013.01)

(58) Field of Classification Search
CPC ..... G06F 15/16; G06F 3/04815; G06Q 50/01; G06Q 10/10; G06Q 30/0269; G06Q 10/107
USPC ......................................................... 715/753
See application file for complete search history.

(56) References Cited

U.S. PATENT DOCUMENTS

| | | | |
|---|---|---|---|
| 2010/0279739 A1* | 11/2010 | Lin et al. | 455/566 |
| 2011/0202430 A1 | 8/2011 | Narayanan et al. | |
| 2012/0110096 A1 | 5/2012 | Smarr et al. | |
| 2012/0143701 A1 | 6/2012 | Reis et al. | |
| 2012/0215816 A1 | 8/2012 | Kidron | |
| 2012/0323938 A1 | 12/2012 | Skeen et al. | |
| 2013/0047115 A1* | 2/2013 | Migos et al. | 715/776 |
| 2013/0227026 A1* | 8/2013 | Jayaram et al. | 709/205 |
| 2014/0075339 A1* | 3/2014 | Weskamp | H04L 65/403 715/753 |
| 2014/0136346 A1* | 5/2014 | Teso | G06Q 30/06 705/14.72 |

FOREIGN PATENT DOCUMENTS

WO    WO-2012-103500 A2    8/2012

* cited by examiner

*Primary Examiner* — Namitha Pillai
(74) *Attorney, Agent, or Firm* — McDermott Will & Emery LLP

(57) ABSTRACT

A system and method for displaying a post unit within a stream interface are provided. A stream interface is provided for display and comprises at least one post unit. For the at least one post unit, post content and a first interface set are provided for display on a first side of the post unit. The first interface set includes one or more interface components for interacting with the post content, and an expand interface component for expanding the first interface set. An indication of a user selection of the expand interface component is received. In response to the received indication, and for the at least one post unit, the post content and a second interface set are provided for display on a second side of the post unit. The second interface set includes a greater number or a different class of interface components for interacting with the post content.

18 Claims, 8 Drawing Sheets

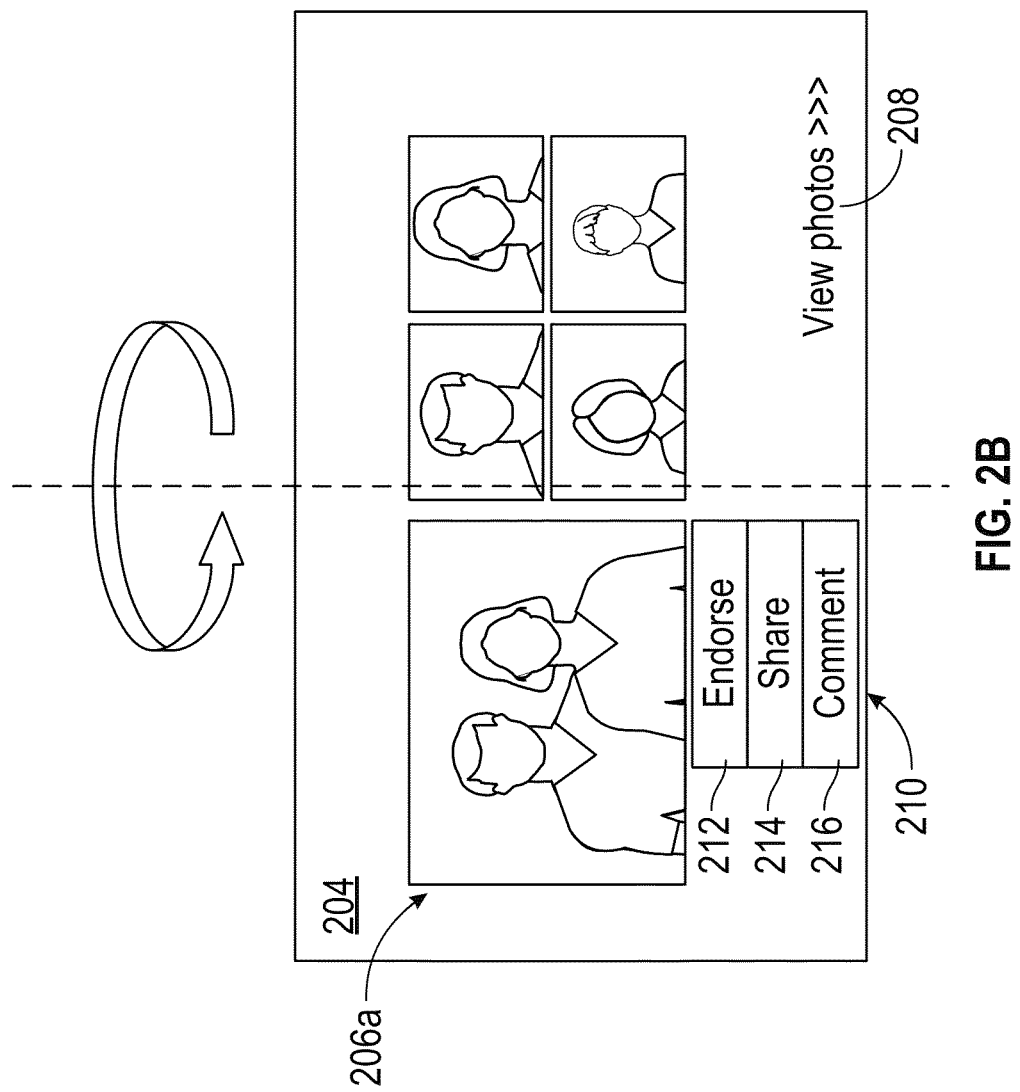

DISPLAYING A POST UNIT WITHIN A STREAM INTERFACE

BACKGROUND

The present disclosure generally relates to stream interfaces and, in particular, to displaying a post unit within a stream interface.

Internet users often spend time reading, viewing or interacting within a stream interface, for example, of a social networking service. In this regard, there is a goal of increasing the user engagement with the stream by providing the user with an interface that allows deep interaction, and content/entertainment features that the user is inclined to interact with. On the other hand, there is also a goal of easy navigation and high usability of the stream, where the user interface of the stream is consistent, intuitive, simple and clean. However, these two goals can conflict each other.

SUMMARY

In one innovative aspect, the disclosed subject matter can be embodied in a method. The method comprises providing a stream interface for display in a stream format, the stream interface comprising at least one post unit having a first side and a second side. The method further comprises providing, for the at least one post unit, post content and a first interface set for display on the first side of the post unit, the first interface set comprising one or more interface components for interacting with the post content, and the first interface set further comprising an expand interface component for expanding the first interface set. The method further comprises receiving an indication of a user selection of the expand interface component. In addition, the method comprises providing, in response to the received indication, and for the at least one post unit, the post content and a second interface set for display on the second side of the post unit, the second interface set comprising a greater number or a different class of interface components for interacting with the post content compared to the one or more interface components of the first interface set.

These and other embodiments can include one or more of the following features. Providing the post content and the second interface set can provide an expanded version of the post content, relative to the post content provided with the first interface set. An animation effect can be provided to transition display from the first side of the post unit to the second side of the post unit.

The interface components for the second interface set can be specific to a type of the post content. The type of the post content can correspond to at least one of the following: a posted link, a photo album, a video, a questionnaire, a voting interface, a video game, a chat session, a video chat session, or a product purchase offer. The second interface set can further comprise an interface component for returning to display of the post content with the first interface set, on the first side of the post unit. The post content can comprise an item for sale, and the first interface set can comprise one or more interface components for displaying the name, price, image and the offer associated to the item for sale. The second interface set can comprise an interface component for purchasing the item.

At least one of the post content and the first interface set or the post content and the second interface set can be provided for 3D display on a 3D screen. The post content and the second interface can be provided for 3D display so as to emerge from the 3D screen. Availability of the 3D screen can be detected, and providing the post content and the first interface set for 3D display, and providing the post content and the second interface set for 3D display can be based on the detected availability of the 3D screen.

The stream interface can be displayed on a mobile device, and receiving the indication of the user selection of the expand interface component can be based on an orientation of the mobile device. The interface components for the second interface set can be user-specified. Providing the post content and the first interface set for display, and providing the post content and the second interface set for display, can be based on an API-based editing mode for the post unit. Log data can be provided for at least one of receiving the indication of the user selection of the expand interface component, receiving user interaction corresponding to the first interface set, or receiving user interaction corresponding to the second interface set.

In another innovative aspect, the disclosed subject matter can be embodied in a system. The system comprises one or more processors, and a machine-readable medium comprising instructions stored therein, which when executed by the processors, cause the processors to perform operations comprising providing a stream interface for display in a stream format, the stream interface comprising at least one post unit. The operations further comprise providing, for the at least one post unit, post content and a first interface set for display, the first interface set comprising one or more interface components for interacting with the post content, and the first interface set further comprising an expand interface component for expanding the first interface set, and receiving an indication of a user selection of the expand interface component. In addition, the operations comprise providing, in response to the received indication, and for the at least one post unit, the post content and a second interface set for display, the second interface set comprising a greater number or a different class of interface components for interacting with the post content compared to the one or more interface components of the first interface set. Providing the post content and the first interface set corresponds to display of a first side of the post unit, and providing the post content and the second interface set corresponds to display of a second side of the post unit.

These and other embodiments can include the following feature. An animation effect can be provided to transition display from the first side of the post unit to the second side of the post unit. Providing the post content and the second interface set can provide an expanded version of the post content, relative to the post content provided with the first interface set. The interface components for the second interface set can be specific to a type of the post content.

In another innovative aspect, the disclosed subject matter can be embodied in a machine-readable medium. The machine-readable medium comprises instructions stored therein, which when executed by a system, cause the system to perform operations comprising providing a stream interface for display in a stream format, the stream interface comprising at least one post unit having a first side and a second side. The operations further comprise providing, for the at least one post unit, post content and a first interface set for display on the first side of the post unit, the first interface set comprising one or more interface components for interacting with the post content, and the first interface set further comprising an expand interface component for expanding the first interface set, and receiving an indication of a user selection of the expand interface component. In addition, the operations comprise providing, in response to the received indication, and for the at least one post unit, the post content and a second interface set for display on the second side of the post unit, the second interface set comprising a greater number or a different class of interface components for interacting with the post content compared to the one or more interface components of the first interface set, and the second interface set further comprising an interface component for returning to display of the post content with the first interface set on the first side of the post unit.

Advantageously, the subject technology provides for increased user engagement within a stream interface, and for multiple perspectives of a post. For example, given a post unit within a stream, a user can quickly access essential functionality for interacting with content of the post unit via the first interface set on the first side of the post unit. To access different (e.g., more advanced) functionality, the user can select the expand interface component within the first interface set, and be directed to the second interface set on the second side of the post unit, where the second interface set includes additional interface components for interacting with the post content.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

FIGS. 2A-2C illustrate example of a post unit having post content and interfaces for interacting with the post content.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As noted above, internet users often spend time reading, viewing or interacting within a stream interface, for example, of a social networking service). In this regard, there is a goal of increasing the user engagement with the stream by providing the user with an interface that allows deep interaction, and content/entertainment features that the user is inclined to interact with. On the other hand, there is also a goal of easy navigation and high usability of the stream, where the user interface of the stream is consistent, intuitive, simple and clean. However, these two goals can conflict each other.

The subject technology provides for displaying a post unit within a stream interface. A stream interface is displayed in a stream format, the stream interface including at least one post unit having a first side (e.g., a front side) and a second side (e.g., a back side). Post content and a first interface set for the at least one post unit are displayed on the first side (e.g., the front side) of the post unit, the first interface set including one or more interface components for interacting with the post content, and further including an expand interface component (e.g., a "view photos" button for a post unit corresponding to a photo album) for expanding the first interface set. A user selection of the expand interface component is received. In response to the user selection, the post content and a second interface set for the at least one post unit are displayed on the second side (e.g., the back side) of the post unit, the second interface set comprising a greater number or a different class of interface components for interacting with the post content compared to the one or more interface components of the first interface set.

Figure 1:
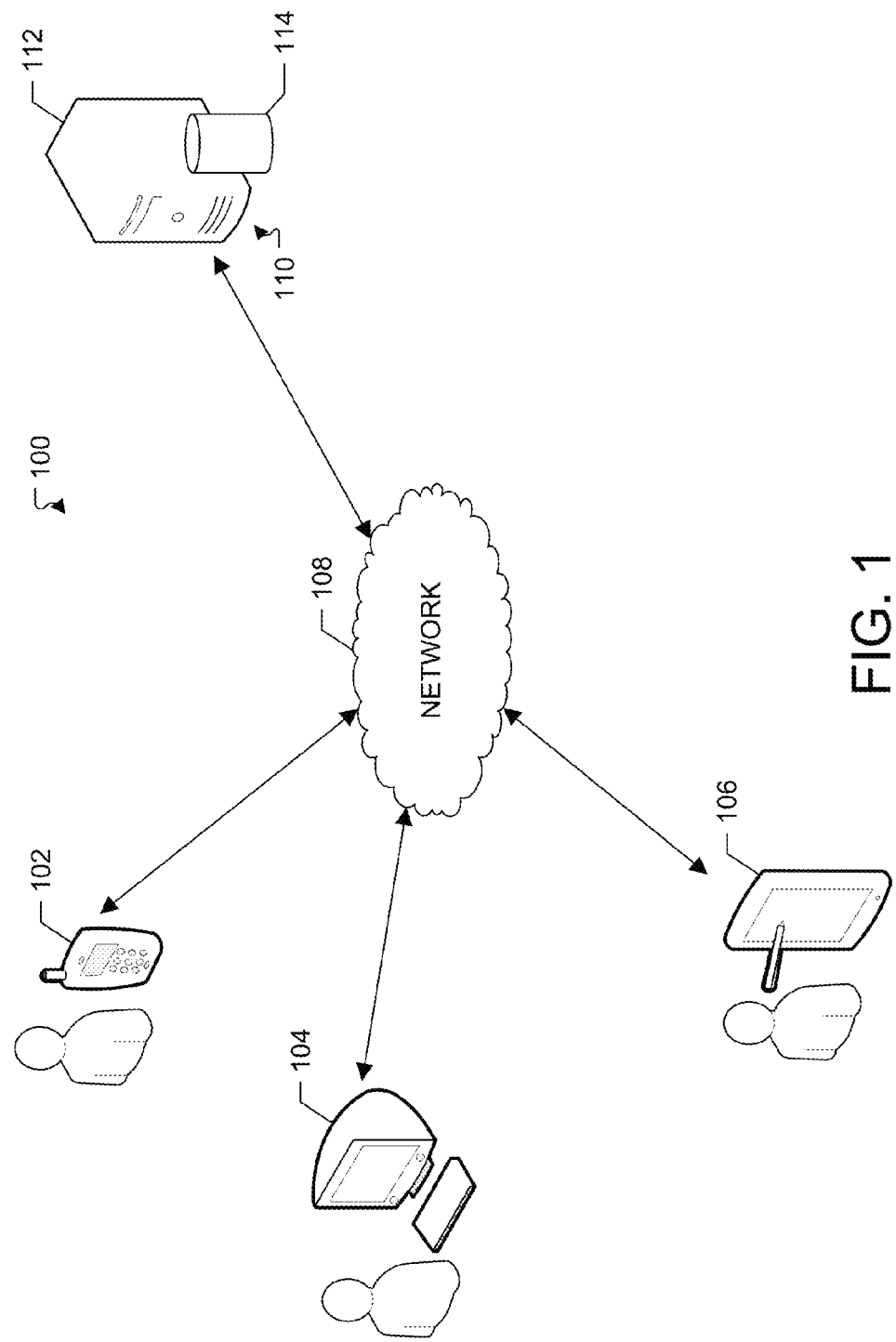
FIG. 1 illustrates an example network environment which provides for displaying a post unit within a stream interface.

FIG. 1 illustrates an example network environment which provides for displaying a post unit within a stream interface. A network environment 100 includes computing devices 102, 104 and 106, and computing system 110. Computing devices 102-106, and computing system 110 can communicate with each other through a network 108. Computing system 110 can include one or more computing devices 112 (e.g., one or more servers), respectively, and one or more computer-readable storage devices 114 (e.g., one or more databases), respectively.

Each of computing devices 102-106 can represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Computing devices 102-106 and 112 may be provided access to or receive application software executed or stored on any of the other computing systems 102-106 and 112.

Computing device 112 may be any system or device having a processor, a memory, and communications capability for providing content to electronic devices 102-106. In some example aspects, server 110 can be a single computing device, for example, a computer server. In other embodiments, server 110 can represent more than one computing device working together to perform the actions of a server computer (e.g., cloud computing). Further, computing device 112 can represent various forms of servers including, but not limited to a web server, an application server, a proxy server, a network server, or a server farm.

In some aspects, the computing devices (e.g., 102-106, 112) may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radiofrequency transceiver (not shown). In addition, short-range communication may occur, for example, using a Bluetooth, WiFi, or other such transceiver.

In some aspects, network environment 100 can be a distributed client/server system that spans one or more networks, for example, network 108. Network 108 can be a large computer network, for example, a local area network (LAN), wide area network (WAN), the Internet, a cellular network, or a combination thereof connecting any number of mobile clients, fixed clients, and servers. Further, network 108 can include, but is not limited to, any one or more of the following network topologies, including a bus network, a star network, a ring network, a mesh network, a star-bus network, tree or hierarchical network, and the like. In some aspects, communication between each client (e.g., computing devices 102-106) and server (e.g., server 110) can occur via a virtual private network (VPN), Secure Shell (SSH) tunnel, or other secure network connection. In some aspects, network 108 may further include a corporate network (e.g., intranet) and one or more wireless access points.

In example aspects, processing device 112 executes computer instructions stored in data store 114, for example, to display a post unit within a stream interface. The stream interface can be provided within an application hosted by server 110. Examples of applications hosted by server 110 include, but are not limited to, a social networking service, a search engine, an ecommerce site, a content site (e.g., a news website, a video-sharing website), a forum site or a blog. The application is accessible, for example, by any of computing devices 102-106.

Server 110 provides the stream interface for display in a stream format (e.g., on any of computing devices 102-106), the stream interface comprising at least one post unit having a first side and a second side. Server 110 provides, for the at least one post unit, post content and a first interface set for display on the first side of the post unit (e.g., on any of computing devices 102-106). The first interface set includes one or more interface components for interacting with the post content, and further includes an expand interface component for expanding the first interface set. Server 110 receives (e.g., from any of computing devices 102-106) an indication of a user selection of the expand interface component. In response to the received indication, and for the at least one post unit, server 110 provides the post content and a second interface set for display on the second side of the post unit. The second interface set includes a greater number or a different class of interface components for interacting with the post content compared to the one or more interface components of the first interface set.

Figure 2A:
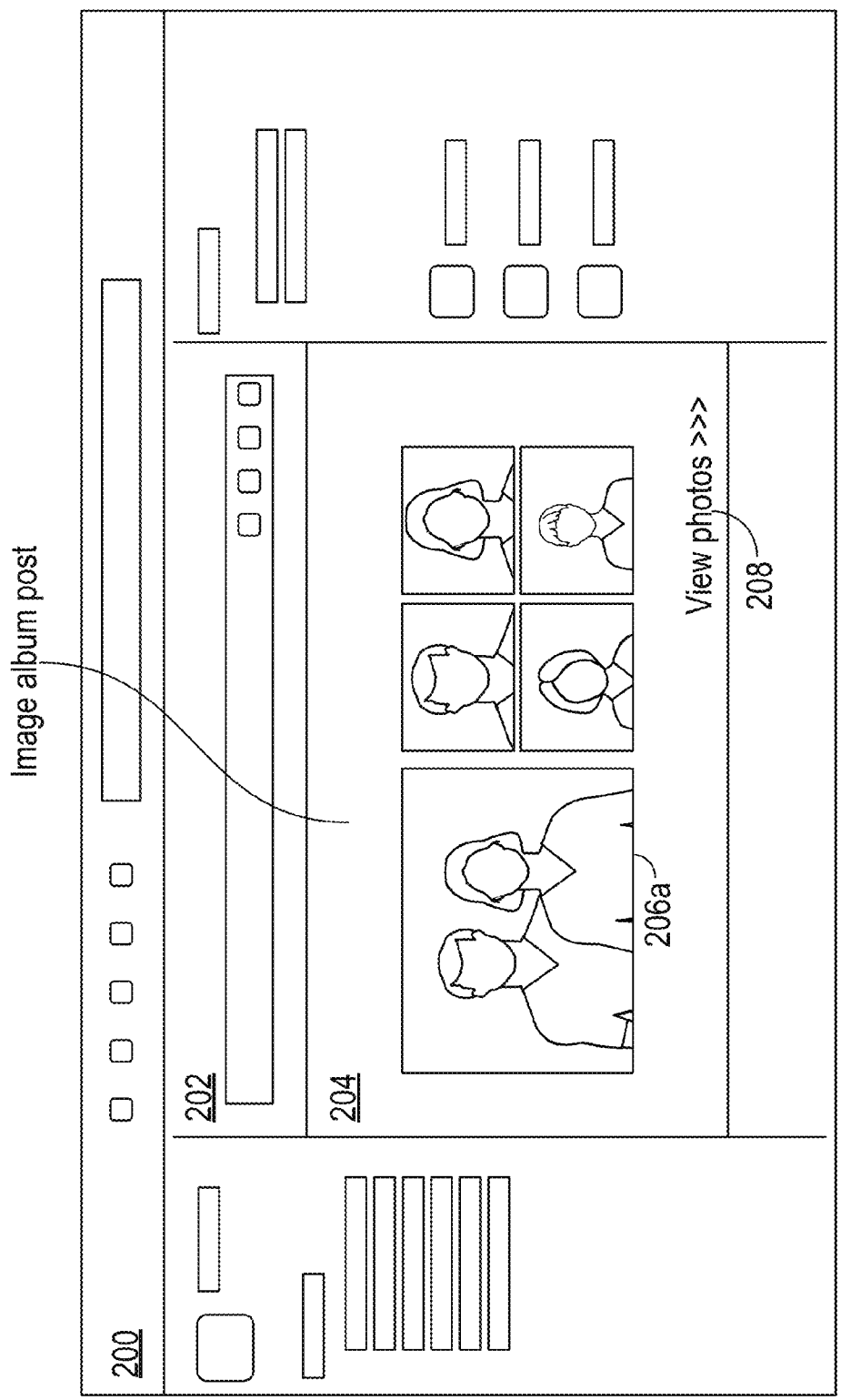
Figure 2C:
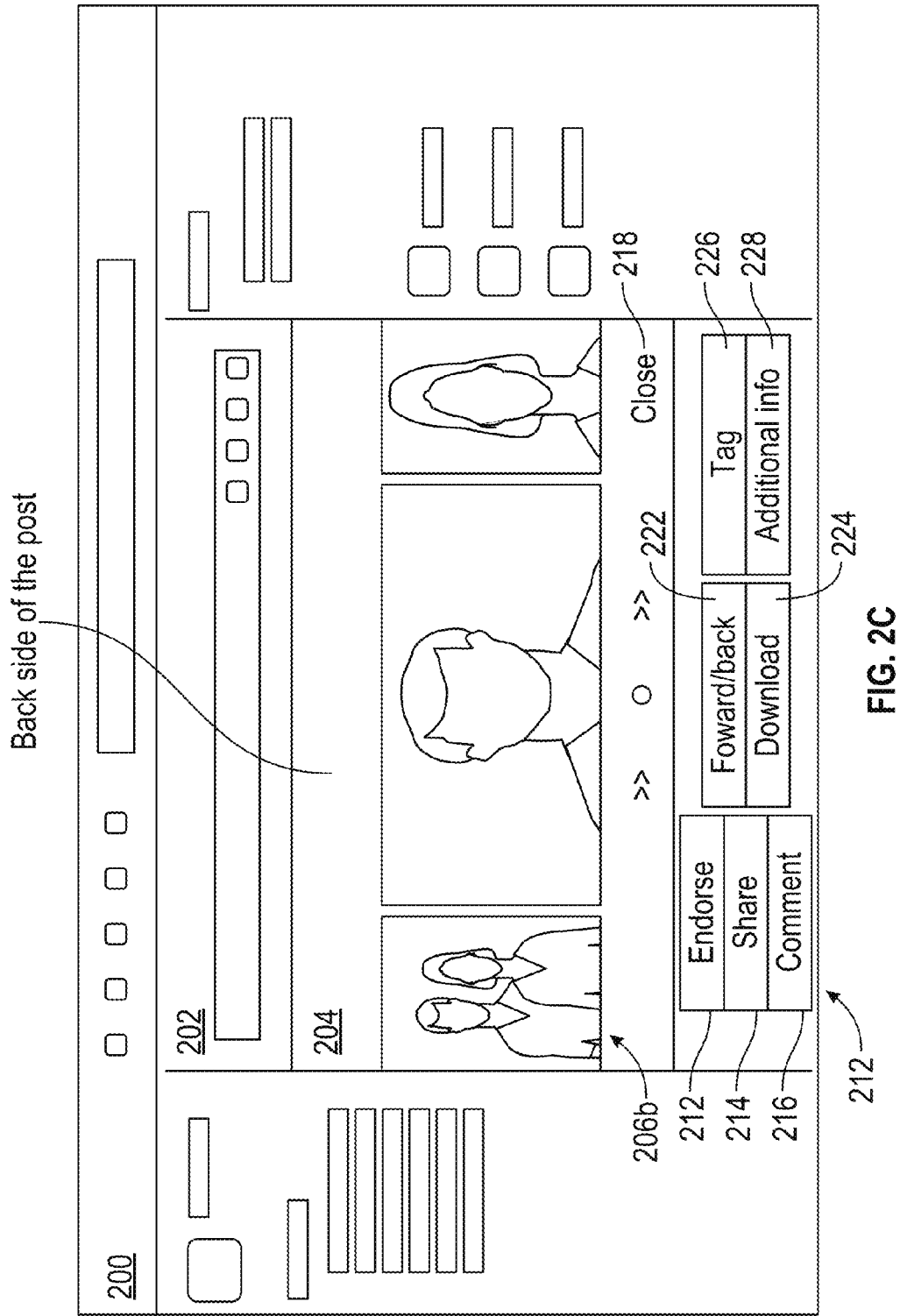

FIGS. 2A-2C illustrate example of a post unit having post content and interfaces for interacting with the post content. FIG. 2A illustrates an application 200 which includes a stream interface 202. Application 200 corresponds to any application which includes a stream interface, including but not limited to, a social networking service, a search engine, an ecommerce site, a content site (e.g., a news website, a video-sharing website), a forum site or a blog. For example, application 200 can be hosted by server 110 and accessible by any of computing devices 102-106.

Stream interface 202 provides for display of one or more post units in a stream format. In the example of FIG. 2A, stream interface 200 includes post unit 204. As can be seen in FIG. 2A, post unit 204 includes post content 206a. For example, post content can correspond to one or more digital photos (e.g., within a photo album), a posted link, a video, a questionnaire, a voting interface, a video game, a chat session, a video chat session, or an item (e.g., product or service) purchase offer. In the example of FIG. 2A, post content 206a corresponds to a photo album with multiple photos.

With reference to FIG. 2B, in addition to post content 206a, post unit 204 also includes multiple interface components for interacting with post content 206a. Post unit 204 includes a first interface set 210 for interacting with the photo album corresponding to post content 206a. First interface set 210 includes an endorse interface component 212 (e.g., an endorse button) for endorsing post content 206a, a share interface component 214 (e.g., a share button) for sharing post content 206a (e.g., with another online contact), and a comment interface component 216 (e.g., a comment button) for commenting on post 206a. In example aspects, first interface set 210 can correspond to essential features (e.g., set as defaults or user-specified) for interacting with post content 206a.

In addition to the above interfaces, post unit 204 includes an expand interface component 208 (e.g., expand button or a "view photos" button), for providing more interface components for interacting with post content 206a. More particularly, a user accessing application 200 can select the expand interface component 208, and in response, application 200 can transition from displaying first interface set 210 to displaying a second interface set 220.

FIG. 2C illustrates second interface set 220, which includes a potentially greater number of interface components, or a different class of interface components, for interacting with the post content compared to the components of the first interface set 210. In the example of FIG. 2C, second interface set 220 includes endorse interface component 212, share interface component 214, and comment interface component 216, which are interface components that are shared with first interface set 210. However, in example aspects, second interface set 220 does not share all of the interface components provided by first interface set 210.

The interface components for second interface set 220 are specific to a type of the post content. For example, since post unit 204 corresponds to a photo album, second interface set 220 further includes a step forward/back interface component 222 (e.g., a step forward/back button) for stepping through photos, a download interface component 224 (e.g., a download button) for downloading photos, a tag interface component 226 (e.g., a tag button) for tagging or otherwise identifying people/objects in photos, and an additional information interface component 228 (e.g., an additional information button) for displaying additional information (e.g., timestamp, geolocation data) for photos. In example aspects, second interface set 220 can correspond to essential features together with advanced features (e.g., set as defaults or user-specified) for interacting with post content 206b.

In addition to second interface set 220, FIG. 2C further provides for post content 206b, corresponding to content for post unit 204. In example aspects, post content 206b includes the same content as post content 206a of FIG. 2B. Alternatively, post content 206b can include different or additional content (e.g., an expanded version of content) relative to post content 206a. For example, although not shown in FIGS. 2B-2C, post content 206a provided with first interface set 210 may be limited to a representative photo (e.g., thumbnail) of a photo album, while post content 206b provided with second interface set 220 may include multiple photos (e.g., thumbnails) of the photo album.

Second interface set 220 can also include a return interface component 218 (e.g., a return button or a "close" button) for returning to display of the post content with first interface set 210. Thus, if a user of application 200 selects return interface component 218, application 200 can return to the display of post content 206a and first interface set 210, as shown in FIG. 2B.

With reference to FIGS. 2A and 2B, providing post content 206a and first interface set 210 can correspond to display of a first side (e.g., a front side) of post unit 204, while providing post content 206b and second interface set 220 can correspond to display of a second side (e.g., a back side) of post unit 204. When the second side (e.g., the back side) of post unit 204 is activated, the application area outside of the post can be grayed out (not shown), to focus the user's attention on the actual post interface (e.g., on post unit 204).

An animation effect (e.g., a "flipping" effect) can be used to transition display from the first side of post unit 204, corresponding to FIG. 2B, to the second side of post unit 204, corresponding to FIG. 2C. The animation effect can be provided server-side (e.g., by server 110). Alternatively, or in addition, the animation effect can be provided locally (e.g., by any of computing devices 102-106). For example, any of computing devices 102-106 accessing application 200 can download the animation effect ahead of time to a web browser on the client device.

Accordingly, FIGS. 2A-2C illustrate an example interface which provides for multiple perspectives of a post unit. In example aspects, a posted photo album (or slideshow) can be viewed on a first side (e.g., front side), with interface components providing essential functionality for interacting with the post content. A user can view the album photos with more advanced functionality by switching (e.g., flipping) the post unit to its second side (e.g., back side). The second side of the post has all, or nearly all, of the interface components necessary for navigating in the photo album, and for returning to the first side of the post.

It should be noted that the switching is not limited to a front and a back side of a post unit. In this regard, the switching can occur for three or more sides. For example, each of the sides can have a respective interface set with different numbers and/or different classes of interface components for interacting with the post content. Furthermore, the subject technology is not limited to sides of a post unit, and can apply to post units having multiple dimensions and/or surfaces.

For example, a post unit can correspond to a three-dimensional shape (e.g., a cube, a pyramid) with each surface of the shape corresponding to a different interface set. Each interface set, in turn, has different numbers and/or different classes of interface components for interacting with the post content. In addition, an animation effect can be employed for switching between interface sets in various directions (e.g., left and right, up and down, diagonally, etc). Thus, in addition to or as an alternative to front and back sides, the subject technology can provide for multiple surfaces, dimensions and/or other representations for a post unit, and can further provide for navigating between the corresponding interface sets.

Figure 3A:
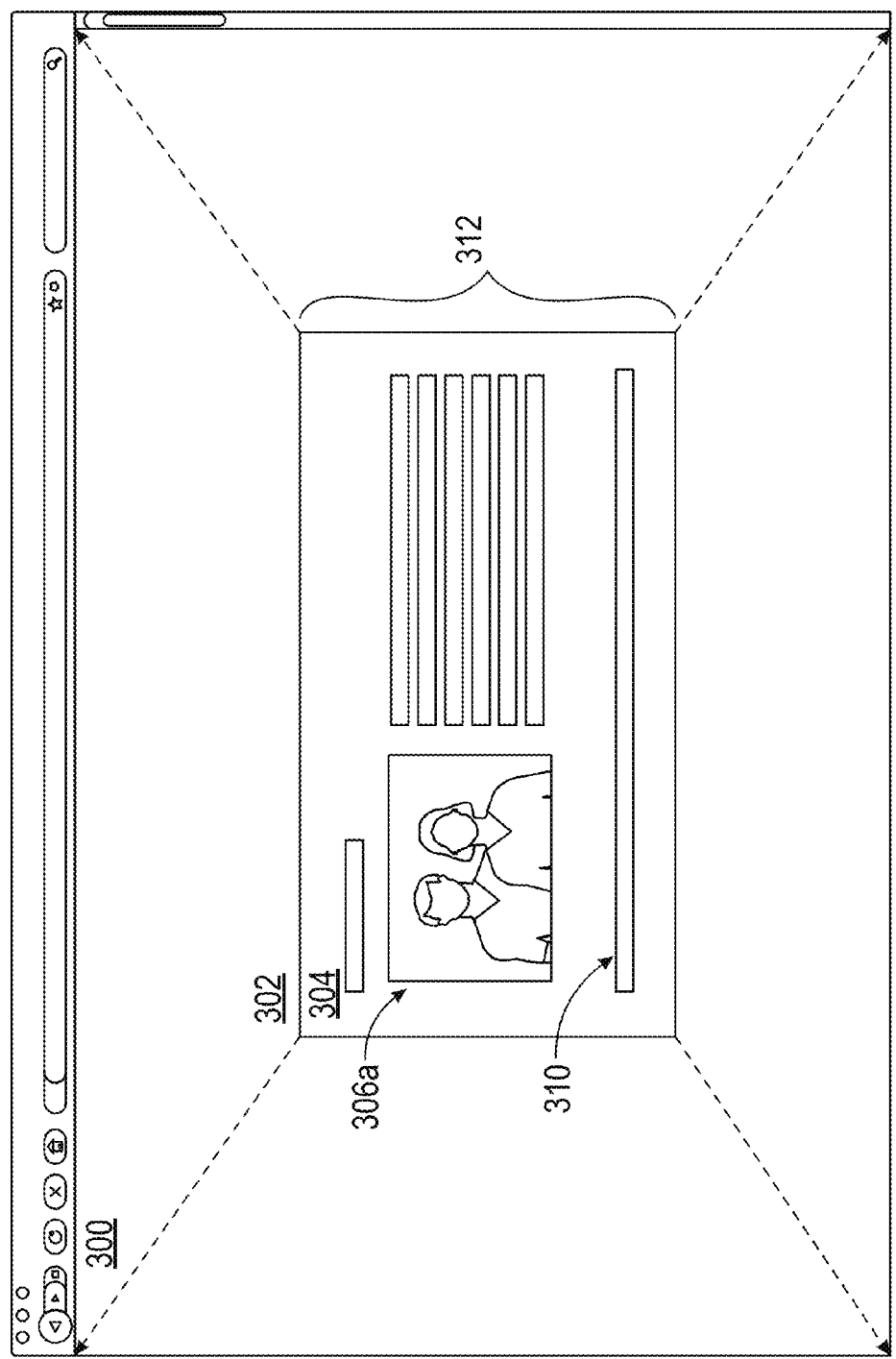
FIGS. 3A-3B illustrate another example of a post unit having post content and interfaces for interacting with the post content.
Figure 3B:
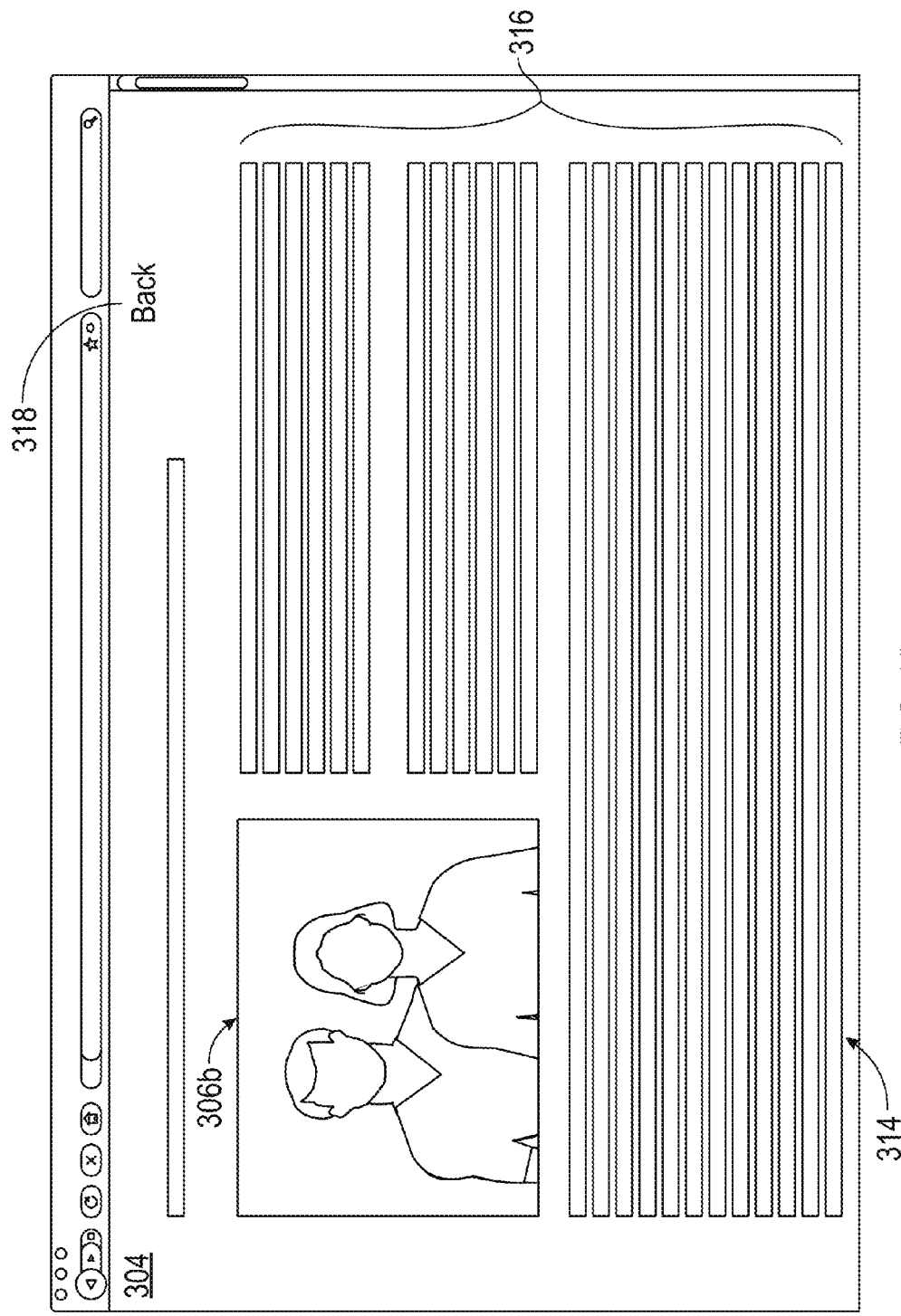

FIGS. 3A-3B illustrate another example of a post unit having post content and interfaces for interacting with the post content. As noted above, post content with a first interface set can be displayed as a first side (e.g., a front side) of a post unit, and post content with a second interface set can be displayed as a second side (e.g., a back side) of the post unit. FIGS. 3A-3B illustrate an addition, or alternative, to displaying multiple sides of a post unit. In particular, FIGS. 3A-3B illustrate displaying different sizes for a post unit.

FIG. 3A illustrates an application 300 which includes a stream interface 302. Application 300 corresponds to any application which includes a stream interface, including but not limited to, a social networking service, a search engine, an ecommerce site, a content site (e.g., a news website, a video-sharing website), a forum site or a blog. For example, application 300 can be hosted by server 110 and accessible by any of computing devices 102-106.

Stream interface 300 provides for display of one or more post units in a stream format. In the example of FIG. 3A, stream interface 300 includes post unit 304. As can be seen in FIG. 3A, post unit 304 includes post content 306a. For example, post content can correspond to one or more digital photos (e.g., within a photo album), a posted link, a video, a questionnaire, a voting interface, a video game, a chat session, a video chat session, or a product purchase offer.

In addition to post content 306a, post unit 304 includes a first interface set 310, which includes one or more interface components for interacting with post content 306a. Post unit 304 can also include an expand interface component (not shown), for providing additional or alternative interface components for interacting with post content 306a. More particularly, a user accessing application 300 can select the expand interface component (e.g., an expand button), and in response, application 300 can transition from displaying first interface set 310 to displaying a second interface set 314.

FIG. 3B illustrates second interface set 314 which includes a potentially greater number of interface components, or a different class of interface components, for interacting with the post content compared to the components of the first interface set 310. In example aspects, second interface set 314 includes the one or more interface components of first interface set 210, as well as additional interface components. In an alternative example, second interface set 314 does not share all of the one or more interface components of first interface set 310. The interface components for second interface set 314 can be specific to a type of the post content.

In addition to second interface set 314, FIG. 3B further provides for post content 306b, corresponding to content for post unit 304. In example aspects, post content 306b includes the same content as post content 306a of FIG. 3B. Alternatively, post content 306b can include different or additional content (e.g., an expanded version of content) relative to post content 306a.

Second interface set 314 can also include a return interface component 318 for returning to display of the post content with first interface set 310. Thus, if a user of application 300 selects return interface component 318, application 300 can return to the display of post content 306a and first interface set 310, as shown in FIG. 3A.

As noted above, FIGS. 3A-3B can display different sizes for a post unit. In this regard, post content 306a and first interface set 310 can be displayed at a first display size 312 (e.g., a normal view size) of post unit 304, while post content 306b and second interface set 314 can be displayed at a second display size 316 (e.g., an enlarged or magnified view size) of post unit 304. In example aspects, the magnified display of second display size 316 can provide for more post content 306b and/or additional interface components within second interface set 314, relative to post content 306a and the one or more interface components of first interface set 310.

An animation effect (e.g., a "growing" effect) can be used to transition display from the first display size of post unit 304, corresponding to FIG. 3A, to the second display size of post unit 304, corresponding to FIG. 3B. The animation effect can be provided server-side (e.g., by server 110). Alternatively, or in addition, the animation effect can be provided locally (e.g., by any of computing devices 102-106). For example, any of client devices 102-106 accessing application 300 can download the animation effect ahead of time to a web browser on the client device.

In example aspects, the user can click on a hyperlink within post unit 304 of FIG. 3A. This can cause application 300 to open the linked page within a full browser window of application 300, as shown by the magnified post unit of FIG. 3B. For example, the hyperlinked page can appear in a full browser screen, as an overlay above application 300. The user can navigate (e.g., including visiting other linked pages provided by post unit 304) throughout the page as usual, and the user can have a one-click return option (e.g., via return interface component 318) to stream interface 302 as shown in FIG. 3A. In an additional example, the visible elements of stream interface 302 which are not part of the expanded and magnified second post unit, can further be separated by overlaying a blur effect on those visible elements.

Thus, FIGS. 3A-3C illustrate that different display sizes can be provided for a post unit, based on whether the first interface set or the second interface set is presented. In addition, FIGS. 2A-2C illustrate that first and second interface sets can be displayed on first and second sides, respectively, of a post unit. In this regard, it should be noted that switching between display of the first interface set and the second interface set can include a combination of displaying first and second sides (e.g., front and back sides), and displaying at first and second display sizes (e.g., normal and magnified sizes).

For example, if the post content corresponds to a photo album, user selection of the expand interface component can cause the application (e.g., hosted on server 110) to switch from a first to a second side of the post unit, and user selection of a photo on the second side can cause the application to magnify the selected picture. In another example, user selection of the expand interface component can cause the application to provide magnified display of the post unit, and user selection of a photo in the magnified display can cause the application to switch from a first side with limited interface components to a second side with additional interface components.

With reference to FIGS. 2A-2C and 3A-3B, switching between the first and second interface sets can be effected by clicking a button (e.g., the expand interface component), hand gestures (e.g., on a touchscreen device), keyboard shortcuts or voice commands. Head gesture control is also possible, for example, in a head mounted device (e.g., glasses providing augmented reality). The post unit can have rounded edges or sharp edges.

Further, the switching between first and second interface sets can be accompanied by a sound effect. On mobile devices, this effect can be a vibration effect. On mobile devices, the switching between first and second interface sets can be adaptive to the user of the mobile device (e.g., based on an orientation/manner that the device is held). The second interface set can include interfaces which are user-specified. Alternatively, the second interface set may be a default set of interfaces specific to the type of post content.

In addition, there may be an API-based editing mode for the post unit. In this regard, a third-party online-merchant can edit the interface (e.g., the look/feel of the first and second interface sets) of a post unit (e.g., provided on a social networking service). In example aspects, certain editing modes and user interface behavior variations can be available to a limited set of users, while other editing modes and user interface behavior variations can be available to every user.

In example aspects, the second interface set (and any changes to the post content) can be downloaded from the server (e.g., server 110) at the time a user selects the expand interface component. Alternatively, the second interface set (and any changes to the post content) can be pre-cached, for example, at the browser level (e.g., using DHTML, HTML or Javascript). Among other features, the second interface set can include interfaces for reporting spam or an interface for generating a direct link to the post.

In example aspects regarding analytics, the switching between first and second interface sets, and any other user interactions within the post unit can be logged, for example, to determine user engagement with the first and second interface sets. In example aspects, the log data is only visible to the author of the post unit. In another example, the log data is visible to other users to which the author of the post provided access. The version of the second interface set provided to the author may include one or more interface components for providing statistical analysis of the logged data (e.g., analysis of overall user engagement with the first and second interface sets).

While FIGS. 2A-2C and 3A-3B illustrate examples of post content corresponding to a photo album, the subject technology is not limited to such. For example, the post content can correspond to an on-line merchant posting an item (e.g., a product or service for sale) within a post unit. The first interface set can be limited to displaying the name, price and image of the item. The second interface set can include additional interfaces, for example, for purchasing the product using a single interface component (e.g., a button) within the post unit displayed in the stream. In addition, the online-merchant can provide for display of coupons (e.g., with corresponding barcodes) for the second interface set, as well as interfaces related to the coupons (e.g., for printing and saving the coupons).

In another example, the post content can correspond to an on-line questionnaire posted within a post unit of a stream. The first interface set can include a title and description of the questionnaire, and the second interface set can include interactive fields. Examples of interactive fields include, but are not limited to radio buttons, text fields, combination boxes, etc., for filling out the questionnaire within the post unit.

In another example, the post unit can correspond to an on-line article. The first interface set can include interfaces for sharing or saving the article. The second interface set can include additional interfaces, such as an interface for displaying related articles.

In addition, the switching between the first interface set and the second interface set can be provided for 3D screens. In this regard, switching between the first and second interface sets can include providing an effect for the second interface set to emerge from the screen. In addition, for a regular TV screen, the above-described animation effects (e.g., for "flipping" between the first and second sides, or for switching between first and second display sizes) can be implemented with standard 3D modes, including but not limited to, red/cyan, green/magenta, blue/yellow, interleaved rows, columns or checkerboard. These implementations can require 3D glasses for the user.

In example aspects, the user can set a user preference (e.g., with or without 3D effect). Furthermore, the server (e.g., server 110) hosting the application with the stream interface (e.g., including the post unit) can detect the availability of 3D screens for which the user does not require special glasses (e.g., autostereoscopic, multiscopic, volumetric or holographic displays). The server can then serve the 3D effect version to such detected screens, while serving a 2D effect version to regular screens.

Although certain examples provided herein can describe a user's information being stored in memory, the user can delete the user information from memory and/or opt out of having the user information stored in memory. In example aspects, the user can adjust appropriate privacy settings to selectively limit the types of user information stored in memory, or select the memory in which the user information is stored (e.g., locally on the user's device as opposed to remotely on a server). In example aspects, the user information does not include and/or share the specific identification of the user (e.g., the user's name) unless otherwise specifically provided or directed by the user.

Figure 4:
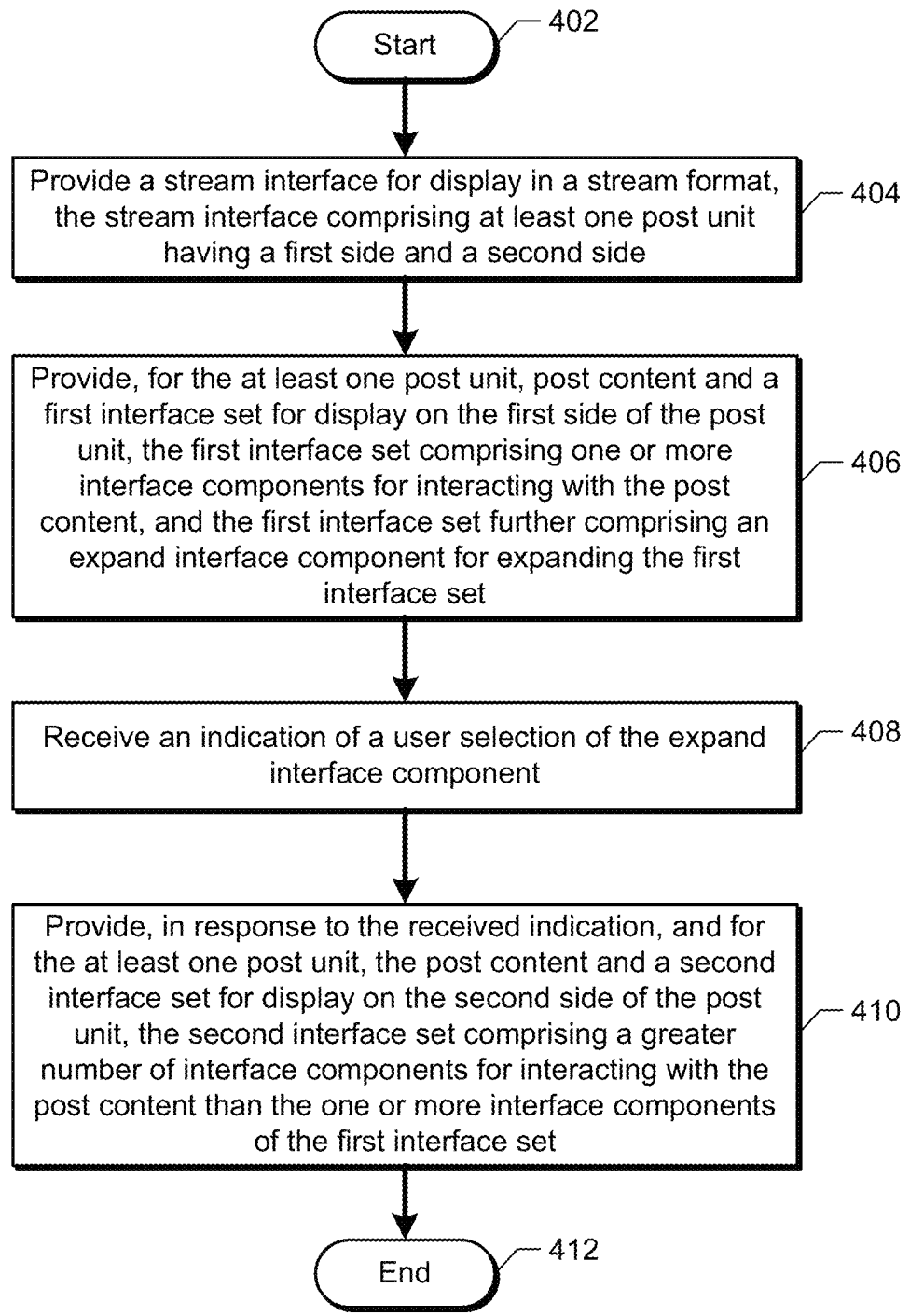
FIG. 4 illustrates an example process by which a post unit is displayed within a stream interface.

FIG. 4 illustrates an example process by which a post unit is displayed within a stream interface. Following start block 402, a stream interface is provided for display in a stream format at step 404. The stream interface includes at least one post unit having a first side and a second side.

At step 406, for the at least one post unit, post content and a first interface set are provided for display on the first side of the post unit. The first interface set includes one or more interface components for interacting with the post content, and further includes an expand interface component for expanding the first interface set. At step 408, an indication of a user selection of the expand interface component is received.

At step 410, in response to the received indication, and for the at least one post unit, the post content and a second interface set are provided for display on the second side of the post unit. The second interface set includes a greater number or a different class of interface components for interacting with the post content compared to the one or more interface components of the first interface set.

The second interface set can further include an interface component for returning to display of the post content with the first interface set, on the first side of the post unit. Providing the post content and the second interface set can provide an expanded version of the post content, relative to the post content provided with the first interface set. An animation effect can be provided to transition display from the first side of the post unit to the second side of the post unit.

The interface components for the second interface set can be user-specified. The interface components for the second interface set can be specific to a type of the post content. The type of the post content can correspond, for example, to at least one of a posted link, a photo album, a video, a questionnaire, a voting interface, a video game, a chat session, a video chat session, or a product purchase offer.

The post content can include an item for sale, and the first interface set can include one or more interface components for displaying the name, price and image of the item for sale. The second interface set can include an interface component for purchasing the item.

At least one of the post content and the first interface set or the post content and the second interface set can be provided for 3D display on a 3D screen. The post content and the second interface can be provided for 3D display so as to emerge from the 3D screen. Availability of the 3D screen can be detected, and providing the post content and the first interface set for 3D display and/or providing the post content and the second interface set for 3D display can be based on the detected availability of the 3D screen.

The stream interface can be displayed on a mobile device, and receiving the indication of the user selection of the expand interface component can be based on an orientation of the mobile device.

Providing the post content and the first interface set for display and/or providing the post content and the second interface set for display can be based on an API-based editing mode for the post unit.

Log data can be provided for at least one of receiving the indication of the user selection of the expand interface component, receiving user interaction corresponding to the first interface set, or receiving user interaction corresponding to the second interface set.

The process then ends at end block 412.

Figure 5:
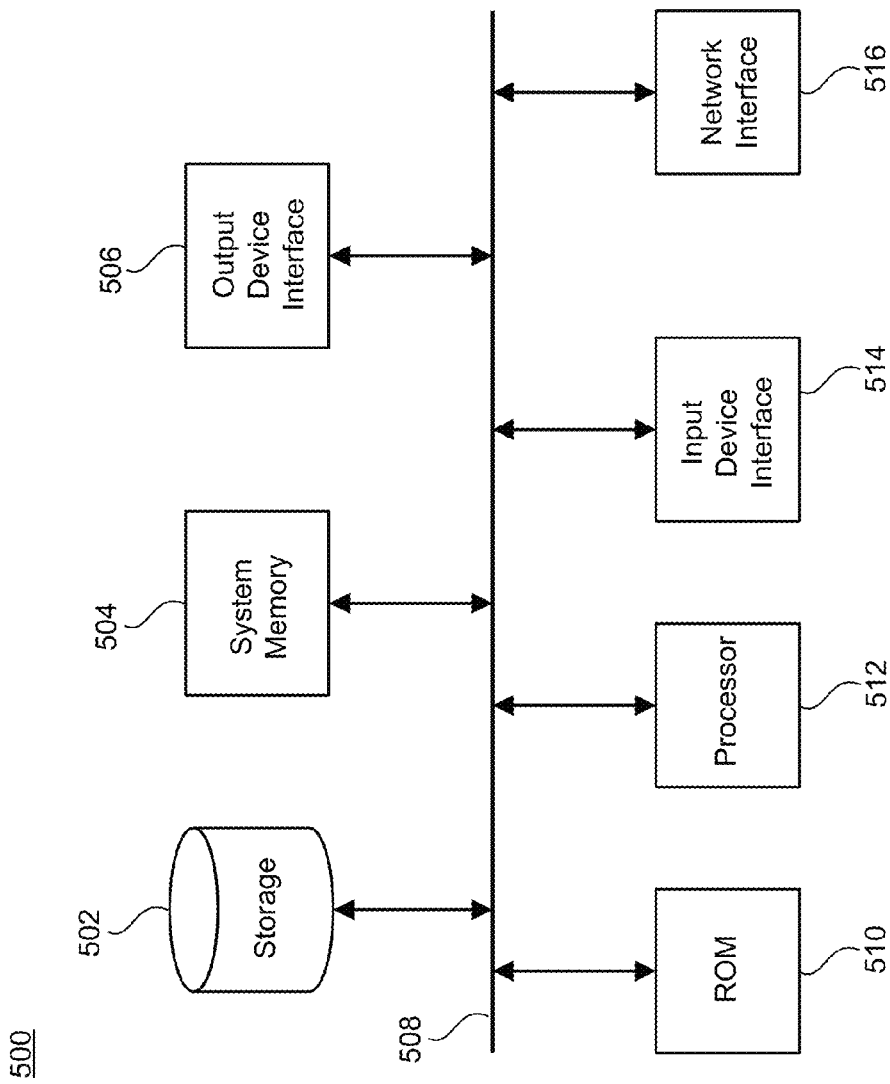
FIG. 5 conceptually illustrates an example electronic system with which some implementations of the subject technology can be implemented.

FIG. 5 conceptually illustrates an example electronic system with which some implementations of the subject technology can be implemented. Electronic system 500 can be a computer, phone, PDA, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (for example, a magnetic or optical disk and its corresponding disk drive) as permanent storage device 502.

Other implementations use a removable storage device (for example, a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, or ROM 510. For example, the various memory units include instructions for displaying a post unit within a stream interface in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, for example, cathode ray tubes (CRT) or liquid crystal displays (LCD). Some implementations include devices, for example, a touchscreen that functions as both input and output devices.

Finally, as shown in FIG. 5, bus 508 also couples electronic system 500 to a network (not shown) through a network interface 516. In this manner, the computer can be a part of a network of computers (for example, a local area network ("LAN"), a wide area network ("WAN"), or an Intranet, or a network of networks, for example, the Internet. Any or all components of electronic system 500 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A method comprising:
   providing a stream interface for display in a stream format, the stream interface comprising at least one post unit, the at least one post unit corresponding to a three-dimensional (3D) shape having three or more surfaces, each surface comprising a different respective set of interface components, the at least one post unit comprising user-generated content posted for display by the stream interface;
   providing, for the at least one post unit, first post content of the user-generated content and a first interface set for display on a first surface of the three or more surfaces, the first interface set comprising one or more interface components for interacting with the first post content and an expand interface component;
   receiving an indication of a user selection of the expand interface component; and
   providing, in response to the received indication, and for the at least one post unit, second post content of the user-generated content and a second interface set for display on a second surface of the three or more surfaces, the second post content including at least the first post content, the second interface set comprising a greater number or a different class of menu buttons for interacting with the user-generated content compared to the one or more interface components of the first interface set, and the interface components for the second interface set being specific to a type of the second post content and including a button for returning to the display of the first surface.

2. The method of claim 1, wherein the second post content comprises an expanded version of the first post content.

3. The method of claim 1, further comprising providing for an animation effect which transitions display from the first surface of the post unit to the second surface of the post unit.

4. The method of claim 1, wherein the type of the first post content corresponds to at least one a posted link, a photo album, a video, a questionnaire, a voting interface, a video game, a chat session, a video chat session, or a product purchase offer.

5. The method of claim 1 further comprising: in response to receiving a user selection of the button for returning to the first surface, displaying the first post content with the first interface set on the first surface.

6. The method of claim 1, wherein the first post content comprises an item for sale, and wherein the first interface set comprises one or more interface components for displaying a name, price and image of the item for sale.

7. The method of claim 6, wherein the second interface set comprises an interface component for purchasing the item.

8. The method of claim 1, wherein at least one of the first post content and the first interface set or the second post content and the second interface set is provided for 3D display on a 3D screen.

9. The method of claim 8, wherein the second post content and the second interface are provided for 3D display so as to emerge from the 3D screen.

10. The method of claim 8, further comprising:
detecting availability of the 3D screen,
wherein providing the first post content and the first interface set for 3D display, and providing the second post content and the second interface set for 3D display are based on the detected availability of the 3D screen.

11. The method of claim 1, wherein the stream interface is displayed on a mobile device, and wherein receiving the indication of the user selection of the expand interface component is based on an orientation of the mobile device.

12. The method of claim 1, wherein the interface components for the second interface set are user-specified.

13. The method of claim 1, wherein providing the first post content and the first interface set for display, and providing the second post content and the second interface set for display, are based on an API-based editing mode for the post unit.

14. The method of claim 1, further comprising:
providing log data for at least one of receiving the indication of the user selection of the expand interface component, receiving user interaction corresponding to the first interface set, or receiving user interaction corresponding to the second interface set.

15. A system comprising:
one or more processors; and
a machine-readable medium comprising instructions stored therein, which when executed by the processors, cause the processors to perform operations comprising:
providing a stream interface for display in a stream format, the stream interface comprising at least one post unit, the at least one post unit corresponding to a three-dimensional (3D) shape having three or more surfaces, each surface comprising a different respective set of interface components, the at least one post unit comprising user-generated content posted for display by the stream interface;
providing, for the at least one post unit, first post content of the user-generated content and a first interface set for display, the first interface set comprising one or more interface components for interacting with the first post content and an expand interface component;
receiving an indication of a user selection of the expand interface component; and
providing, in response to the received indication, and for the at least one post unit, second post content of the user-generated content and a second interface set for display, the second post content including at least the first post content, the second interface set comprising a greater number or a different class of menu buttons for interacting with the user-generated content compared to the one or more interface components of the first interface set, and one or more of the interface components for the second interface set being specific to a type of the second post content,
wherein providing the first post content and the first interface set corresponds to display of a first surface of the three or more surfaces, wherein providing the second post content and the second interface set corresponds to display of a second surface of the three or more surfaces, and wherein the second interface set includes a button for returning to the first surface.

16. The system of claim 15, further comprising providing for an animation effect which transitions display from the first surface of the at least one post unit to the second surface of the at least one post unit.

17. The system of claim 15, wherein the second post content comprises an expanded version of the first post content.

18. A non-transitory machine-readable medium comprising instructions stored therein, which when executed by a system, cause the system to perform operations comprising:
providing a stream interface for display in a stream format, the stream interface comprising at least one post unit, the at least one post unit corresponding to a three-dimensional (3D) shape having three or more surfaces, each surface comprising a different respective set of interface components, the at least one post unit comprising user-generated content posted for display by the stream interface;
providing, for the at least one post unit, first post content of the user-generated content and a first interface set for display on a first surface of the three or more surfaces, the first interface set comprising one or more interface components for interacting with the first post content, and the first interface set further comprising an expand interface component;
receiving an indication of a user selection of the expand interface component; and
providing, in response to the received indication, and for the at least one post unit, second post content of the user-generated content and a second interface set for display on a second surface of the three or more surfaces, the second post content including at least the first post content, the second interface set comprising a greater number or a different class of menu buttons for interacting with the user-generated content compared to the one or more interface components of the first interface set, one or more of the interface components for the second interface set being specific to a type of the second post content, and including a button for returning to a display of the first post content with the first interface set on the first surface of the post unit.

* * * * *